US009355115B2

(12) United States Patent
Garcia-Ascanio et al.

(10) Patent No.: US 9,355,115 B2
(45) Date of Patent: May 31, 2016

(54) CLIENT APPLICATION FILE ACCESS

(75) Inventors: Francisco Garcia-Ascanio, Bellevue, WA (US); Joshua Adam Alpern Boehm, Redmond, WA (US); David Diffenbaugh, Bothell, WA (US); Daniel Vincent Fiordalis, Seattle, WA (US); Joseph Wiggs, Seattle, WA (US); Alyssa Irwin, Seattle, WA (US); Denise Elisabeth Signer, Redmond, WA (US); Adam Linkon, Redmond, WA (US); Allison O'Mahony, Bellevue, WA (US); Mona Akmal, Bellevue, WA (US); Roger Allen Lueder, Redmond, WA (US); Miko Arnab Sakhya Singha Bose, Seattle, WA (US); Balaji Balasubramanyan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/301,039

(22) Filed: Nov. 21, 2011

(65) Prior Publication Data

US 2013/0132463 A1 May 23, 2013

(51) Int. Cl.
*G06F 17/30* (2006.01)
*H04L 29/08* (2006.01)
(52) U.S. Cl.
CPC .... *G06F 17/30174* (2013.01); *G06F 17/30132* (2013.01); *G06F 17/30902* (2013.01); *H04L 67/1095* (2013.01)
(58) Field of Classification Search
CPC .......... G06F 17/30174; G06F 2221/0793; G06F 17/30132; G06F 17/30902; H04L 67/1095
See application file for complete search history.

(56) References Cited

U.S. PATENT DOCUMENTS

| 6,578,054 B1 | 6/2003 | Hopmann |
| 6,938,042 B2 | 8/2005 | Aboulhosn et al. |

(Continued)

FOREIGN PATENT DOCUMENTS

| KR | 2011012867 A | 11/2011 |
| KR | 20110123867 A | 11/2011 |

(Continued)

OTHER PUBLICATIONS

"Colligo for sharepoint", Retrieved at <<http://www.uc-software.com/Colligo.html>>, Retrieved Date: Sep. 21, 2011, pp. 2.

(Continued)

*Primary Examiner* — Matthew Smithers
(74) *Attorney, Agent, or Firm* — Bryan Webster; Judy Yee; Micky Minhas

(57) ABSTRACT

One or more techniques and/or systems are disclosed for providing a client application with access to a file based upon a local offline version of the file and/or web online version of the file. That is, a file may be shared/synchronized from a remote source, such as a web storage service. A web online version of the file may be maintained by the web storage service, while local offline versions of the file may be stored at client devices. A sync module comprising knowledge of the local and/or web versions of the file may provide a client application with access to the file based upon the local and/or web version of the file. The sync module may also delegate synchronization authorization to the client application given that the client application may comprise sophisticated file handling functionality.

12 Claims, 9 Drawing Sheets

(56) References Cited

U.S. PATENT DOCUMENTS

| | | | |
|---|---|---|---|
| 7,594,003 B2* | 9/2009 | Davidson et al. | 709/219 |
| 7,885,925 B1* | 2/2011 | Strong et al. | 707/620 |
| 7,930,757 B2* | 4/2011 | Shapiro et al. | 726/27 |
| 7,966,426 B2 | 6/2011 | Smith et al. | |
| 8,452,853 B2* | 5/2013 | Batra et al. | 709/219 |
| 8,683,526 B2* | 3/2014 | Ruiz-Velasco et al. | 725/50 |
| 2001/0039540 A1* | 11/2001 | Hofmann et al. | 707/3 |
| 2003/0140115 A1 | 7/2003 | Mehra et al. | |
| 2005/0027673 A1 | 2/2005 | Moritani et al. | |
| 2005/0120082 A1* | 6/2005 | Hesselink et al. | 709/203 |
| 2005/0193269 A1* | 9/2005 | Haswell et al. | 714/38 |
| 2006/0004927 A1* | 1/2006 | Rehman et al. | 709/250 |
| 2006/0224687 A1* | 10/2006 | Popkin et al. | 709/217 |
| 2006/0242259 A1 | 10/2006 | Vallabh et al. | |
| 2007/0033569 A1* | 2/2007 | Davidson et al. | 717/103 |
| 2007/0083486 A1* | 4/2007 | Bloch et al. | 707/1 |
| 2007/0088702 A1* | 4/2007 | Fridella et al. | 707/10 |
| 2007/0101315 A1* | 5/2007 | Dahyabhai et al. | 717/120 |
| 2007/0198657 A1* | 8/2007 | Saliba et al. | 709/219 |
| 2007/0239725 A1* | 10/2007 | Bhat et al. | 707/10 |
| 2007/0260701 A1 | 11/2007 | Thomason | |
| 2008/0086540 A1* | 4/2008 | Scott et al. | 709/217 |
| 2008/0127065 A1* | 5/2008 | Bryant et al. | 717/109 |
| 2008/0222628 A1* | 9/2008 | Batra et al. | 717/171 |
| 2009/0094332 A1* | 4/2009 | Schemers et al. | 709/206 |
| 2009/0125526 A1* | 5/2009 | Neufeld | 707/10 |
| 2009/0157627 A1* | 6/2009 | Arthursson | 707/3 |
| 2009/0171679 A1 | 7/2009 | Salgado et al. | |
| 2009/0248695 A1* | 10/2009 | Ozzie et al. | 707/10 |
| 2010/0169392 A1* | 7/2010 | Lev Ran et al. | 707/827 |
| 2010/0262582 A1* | 10/2010 | Garcia-Ascanio et al. | 707/634 |
| 2010/0318892 A1* | 12/2010 | Teevan et al. | 715/229 |
| 2011/0078623 A1* | 3/2011 | Liu et al. | 715/791 |
| 2011/0093597 A1* | 4/2011 | Hopmann et al. | 709/226 |
| 2011/0106880 A1* | 5/2011 | Strong et al. | 709/203 |
| 2011/0314503 A1* | 12/2011 | Ruiz-Velasco et al. | 725/47 |
| 2012/0233251 A1* | 9/2012 | Holt et al. | 709/204 |
| 2012/0280799 A1* | 11/2012 | Singh et al. | 340/10.51 |
| 2013/0212112 A1* | 8/2013 | Blom et al. | 707/741 |

FOREIGN PATENT DOCUMENTS

| | | |
|---|---|---|
| WO | 03/063013 A1 | 7/2003 |
| WO | 03/063813 A1 | 7/2003 |

OTHER PUBLICATIONS

Int. Search Report cited in PCT Application No. PCT/US2012/065468 dated Apr. 1, 2013, 10 pgs.

European Patent Application No. 12851619.2 (foreign counterpart to U.S. Appl. No. 13/301,039), Extended European Search Report dated Jul. 27, 2015, 5 pages.

European Patent Application No. 12851619.2, Communication dated Feb. 23, 2016, 11 pages (foreign counterpart to U.S. Appl. No. 13/301,039).

* cited by examiner

CLIENT APPLICATION FILE ACCESS

BACKGROUND

Many users own a variety of computing devices, such as laptops, desktops, smart phones, and/or other devices. It may be desirable to share data between such devices. In one example, a web storage service may allow a user to upload files to online storage, and synchronize such files between various devices. In particular, a synchronization service, such as a sync module, may be installed on a user device. When files to be shared are available (e.g., not presently being accessed by a client application), the synchronization service may upload the shared files to the web storage service. Unfortunately, the synchronization service may comprise inefficient and/or inadequate file handling capabilities, at least as compared to a client application. For example, the synchronization service may comprise generic upload/download functionality that may not be tailored for particular types of files (e.g., whereas a word processing client application may be able to save changes to a text document in a desired, efficient, etc. manner, for example). Nevertheless, while a client application may comprise sophisticated file handling functionality, the client application (unlike the synchronization service) may, however, be unaware of the existence of the synchronization service, synchronization techniques that may be in place and/or the availability of offline access.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for providing a client application with access to a file, delegating synchronization authorization to the client application, and/or providing the client application with offline access to the file are disclosed herein. A client device hosting a client application may be associated with a sync module configured to access a web storage service hosting online storage. The online storage may be configured to store web online versions of shared files. The sync module may be configured to receive notifications from the web storage service regarding the web online versions of shared files (e.g., a notification that a web online version of a file was added, removed, and/or modified). The sync module may be configured to manage local offline versions of shared files (e.g., the sync module may add, remove, and/or modify local copies of files shared through the web storage service). In this way, the sync module may comprise knowledge, such as synchronization information, associated with local offline versions of files and/or web online versions of files (e.g., where client applications do not possess such knowledge). Accordingly, the sync module may provide synchronization information to a client application (e.g., a URL of a web online version of a file, a local file path of a local offline version of the file, synchronization authorization, etc.), such that the client application may perform synchronization of files, access a file based upon a local offline version of the file and/or a web online version of the file, and/or access shared files even if the web storage service and/or the client device may be offline (e.g., offline access may be provided to previously synchronized files). It may be appreciated that synchronization of files performed by the client application may range from merely transferring file data (e.g., transferring files up to and/or down from online storage) to performing sophisticated synchronization functionality (e.g., synchronizing content between files). That is, synchronization and/or the like may merely comprise transferring data as opposed to synchronizing data files, although it could, of course, comprise synchronizing as well.

In one example of providing a client application with access to a file, a request from a client application to access a file may be received. For example, a word processor may generate a request comprising a local file path associated with a local offline version of a shared text file, a URL associated with a web online version of the shared text file, and/or a general inquiry requesting an enumeration of shared text files. If a local offline version of the file is stored locally, then the client application may be provided with access to the local offline version as the file (e.g., the word processor may be provided with access to a text file derived at least in part from a local offline version of the text file). In one example, access may be provided to the local offline version of the file even if a web online version of the file is unavailable (e.g., offline). If a web online version of the file is stored remotely, then the client application may be provided with access to the web online version of the file as the file (e.g., the word processor may be provided with access to the text file derived at least in part from a web online version of the text file).

In one example, the client application may be provided with access to both the local offline version of the file and the web online version of the file as the file (e.g., the word processor may be provided with access to the text file derived from at least some of the local offline version of the text file and at least some of the web online version of the text file, such that the text file accessed by the word processor may be associated with both the local offline version of the text file and the web online version of the text file). In this way, interactions with and/or modifications to the file by the client application may be synchronized between the file accessed by the client application, the local offline version of the file, and/or the web online version of the file. For example, synchronization may be performed real-time while the client application is accessing the file. Such real-time synchronization may enable co-authoring between the file and a corresponding file accessed by a remote client application. For example, the file and/or the corresponding file may be updated in real-time based upon the web online version of the file accessible to the client application and/or the remote client application.

In one example of delegating synchronization authorization to a client application, a client application configured to interact with a particular file type with which a file is formatted may be identified (e.g., a word processor may be configured to interact with text files formatted as a .txt file type). The client application may comprise sophisticated file handling functionality with regard to the file type. For example, a word processor may be configured to merely save changes made to an existing text file, as opposed to resaving the entire text file. Because a plethora of different file types may be shared by the web storage service (e.g., .txt text files, .bmp image files, .zip compressed files, .xls spreadsheet files, etc.), the sync module may not comprise adequate file handling functionality with regard to the various file types (e.g., the sync module may merely comprise generic download/upload functionality). Accordingly, it may be efficient for the sync module to delegate synchronization authorization to the client application so that the client application may synchronize a file accessed by the client application, a local offline version of the file, and/or a web online version of the file. It may be appreciated that aspects herein generally promote, leverage, etc. strengths, advantages, etc. associated with synchronization services and client applications, for example, while mitigating, circumventing, etc. weaknesses, disadvantages, etc. associated with synchronization services and client applications, for example. It may be appreciated that in one example, delegating synchronization authorization may comprise merely delegating the task of synchronization (e.g., file transfer) to the client application (e.g., as opposed to performing extensive security functionality to grant authorization access to files). That is, (unless indicated to the contrary) even though delegating synchronization 'authorization' and/or the like may be used herein throughout, the instant application, including the scope of the appended claims, is not meant to be limited to and/or require authorizing actions (e.g., requesting and/or verifying credentials, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
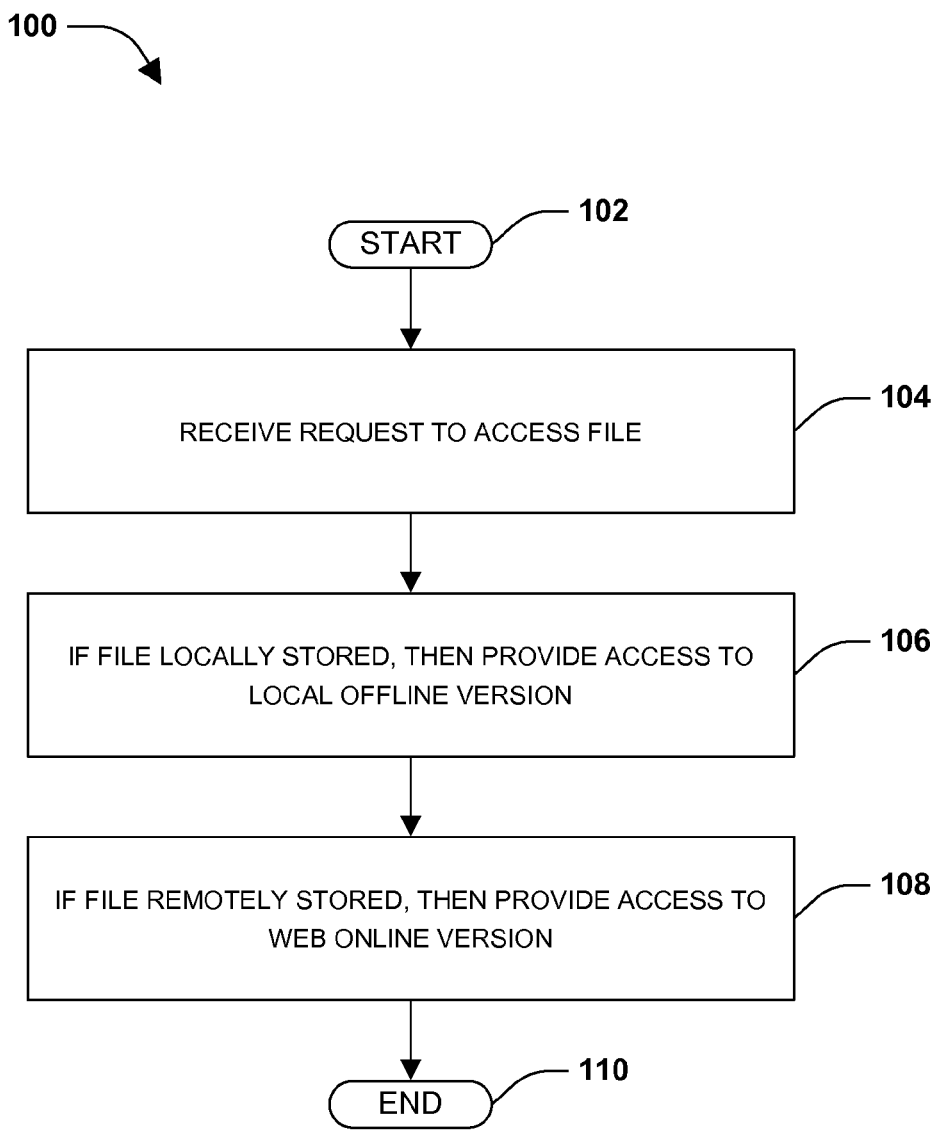
FIG. 1 is a flow chart illustrating an exemplary method of providing a client application with access to a file.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing subject matter.

Today, data is commonly shared between computing devices. For example, a user may share photos between a desktop device and a smart phone using online storage hosted by a web storage service. Synchronization of the shared photos may be provided by a sync module on the desktop device and the smart phone. Unfortunately, if the web storage service is unavailable (e.g., offline), then the user may be unable to access the shared photos stored within the online storage from the desktop device and/or the smart phone. Additionally, the sync module may be unfamiliar with the file type associated with the shared photos (e.g., the sync module may merely comprise generic upload/download functionality), whereas a photo client application on the desktop device and/or smart phone may be better suited for handling storage/synchronization functionality associated with the shared photos. However, the photo client application may be unaware of the web storage service and/or the synchronization policy that may be in place. Thus, without leveraging the sophisticated file handling functionality of the photo client application, the sync module may be inefficient at synchronizing the shared photos.

Accordingly, among other things, one or more systems and/or techniques for providing a client application with access to a file, delegating synchronization authorization to the client application, and/or providing the client application with offline access to the file are provided herein.

One embodiment of providing a client application with access to a file is illustrated by an exemplary method 100 in FIG. 1. At 102, the method starts. At 104, a request from a client application to access a file may be received. In one example of receiving the request, the request may comprise an inquiry to a sync module about available files shared by a web storage service. The sync module may determine one or more file types that the client application may be able to understand and/or interact with (e.g., the client application may provide file type compatibility information to the sync module). In this way, the client application may be provided with access to one or more files formatted according to file types corresponding to the identified file types. In another example of receiving the request, the request may comprise a local file path associated with the file shared by the web storage service. In another example, the request may comprise a URL associated with the file shared by the web storage service. In another example, the request may comprise a resourceID identifying the file (e.g., the resourceID may uniquely identify the file with the sync module, the web storage service, and/or the client application). It may be appreciated that in one example, the sync module may comprise knowledge regarding files shared by the web storage service and/or locally stored versions of shared files, whereas the client application may lack such knowledge.

At 106, if a local offline version of the file is stored locally, then the client application may be provided with access to the local offline version as the file. For example, a local file path associated with the local offline version of the file may be provided to the client application (e.g., the sync module may derive the local file path based upon a URL associated with the web online version that may have been specified within the request by the client application). In this way, the client application may open the file from the local offline version using the local file path. In one example, if the file is designated to be stored locally, but is not yet stored locally, then the sync component may provide the client application with a local path at which a new local offline version of the file is to be created by the client application. At 108, if a web online version of the file is stored remotely (e.g., within online storage hosted by the web storage service), then the client application may be provided with access to the web online version of the file as the file. For example, a URL associated with the web online version of the file may be provided to the client application (e.g., the sync module may derive the URL based upon a local file path associated with the local offline version that may have been specified within the request by the client application). In this way, the client application may open the file form the web online version using the URL. In one example, if the file is designated to be stored remotely, but is not yet stored remotely, then the sync component may provide the client application with a remote path at which a new remote version of the file is to be created by the client application.

In one example, the client application may be provided with merely access to the local offline version as the file because the web online version of the file may not be available (e.g., offline) and/or may be inefficient for the client application to access. In another example, the client application may be provided with merely access to the web online version as the file because the web online version may be an up-to-date version of the file and/or a local offline version of the file may be unavailable. In another example, the client application may be provided with access to both the local offline version of the file and the web online version of the file as the file. That is, the file accessed by the client application may be derived from and/or synchronously associated with at least some of the local offline version of the file and at least some of the web online version of the file. In this way, the file accessed by the client application, the local offline version of the file, and/or the web online version of the file may be synchronized. Such synchronization may, for example, enable co-authoring of the file between the client application and a remote client application accessing a corresponding file. For example, the file and the corresponding file may be synchronized through the web online version of the file (e.g., modifications made to the web online version of the file by the remote client application may be detected by the sync module, and the sync module may instruct the client application to synchronize the file with the web online version of the file).

The client application may comprise sophisticated functionality for handling certain file types, whereas the sync module may not comprise such advanced functionality (e.g., the sync module may merely comprise generic upload/download functionality due to the wide variety of file types that may be associated with shared files). Accordingly, synchronization authorization may be delegated to the client application. In one example, the client application may be provided with a local file path associated with the local offline version of the file, and may be delegated synchronization authorization to synchronize the file accessed by the client application with the local offline version of the file using the local file path. In another example, the client application may be provided with a URL associated with the web online version of the file, and may be delegated synchronization authorization to synchronize the file accessed by the client application with the web online version of the file using the URL. In another example, the client application may be delegated synchronization authorization to synchronize the file accessed by the client, the local offline version of the file, and/or the web online version of the file. In this way, file handling functionality provided by the client application may be leveraged to provide enhanced synchronization.

Because the sync module may subscribe to notifications from the web storage service, the sync module may provide a notification to the client application that the web online version of the file was modified, and may instruct the client application to synchronize the file accessed by the client application and the web online version of the file. Because the sync module may monitor local storage of shared local files, the sync module may instruct the client application to synchronize the file accessed by the client application and the local offline version of the file. At 110, the method ends.

Figure 2:
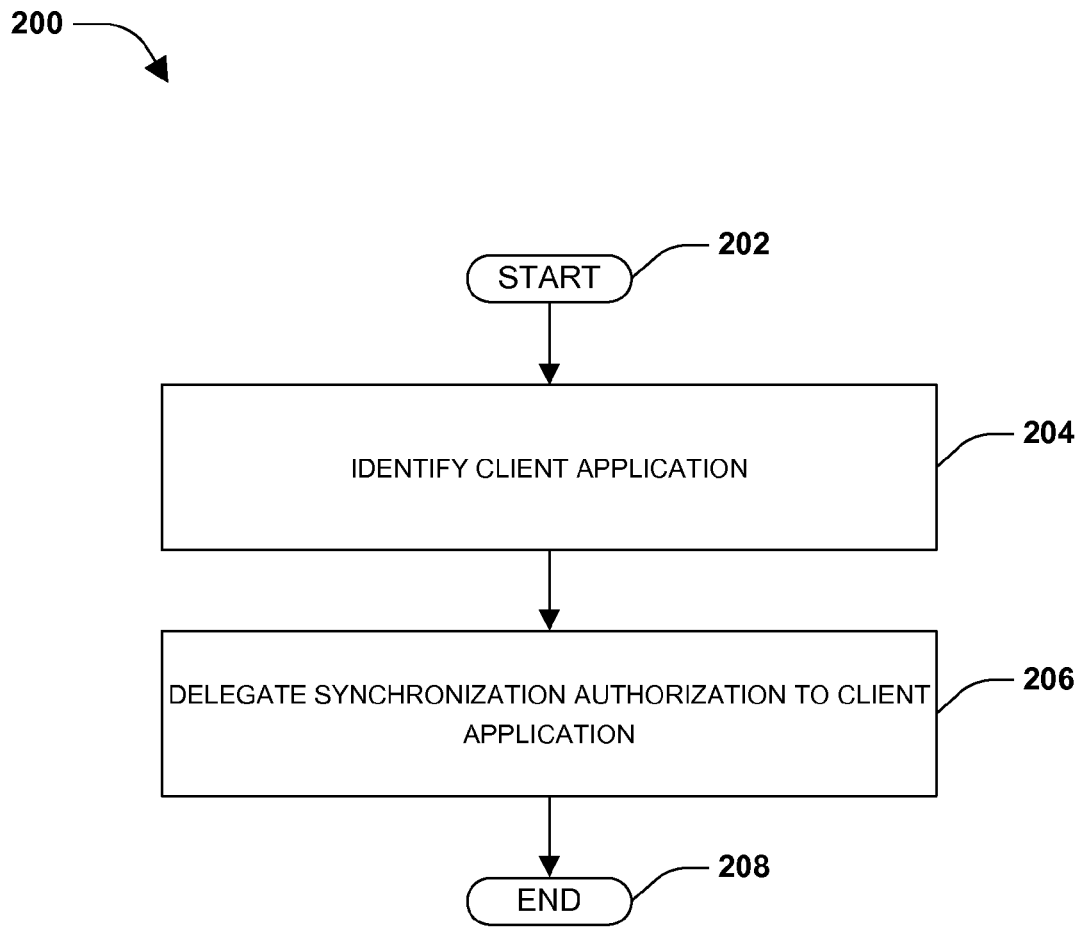
FIG. 2 is a flow chart illustrating an exemplary method of delegating synchronization authorization to a client application.

One embodiment of delegating synchronization authorization to a client application is illustrated by an exemplary method 200 in FIG. 2. At 202, the method starts. At 204, a client application configured to interact with a particular file type with which a file is formatted may be identified. For example, an operating system registry may be consulted to determine whether the client application can open files formatted according to the file type (e.g., a registry key may indicate that a word processor may be capable of opening a .txt file). In another example, an installation of the client application, an un-installation of the client application, a modification to the client application and/or a file type (e.g., .txt and .docx (e.g., but not .jpg)) associated with the client application may be identified using one or more registry keys within the operating system registry. At 206, synchronization authorization may be delegated to the client application to synchronize the file accessed by the client application and a local offline version of the file and/or a web online version of the file. In one example, the file may be identified by a resourceID (e.g., the resourceID may uniquely identify the file with the sync module, the web storage service, and/or the client application).

In one example, the client application may be provided with a local file path associated with the local offline version of the file, and may be delegated synchronization authorization to synchronize the file accessed by the client application with the local offline version of the file using the local file path. In another example, the client application may be provided with a URL associated with the web online version of the file, and may be delegated synchronization authorization to synchronize the file accessed by the client application with the web online version of the file using the URL. In another example, the client application may be delegated synchronization authorization to synchronize the file accessed by the client, the local offline version of the file, and/or the web online version of the file. In this way, file handling functionality provided by the client application may be leveraged to provide enhanced synchronization. At 208, the method ends.

Figure 3:
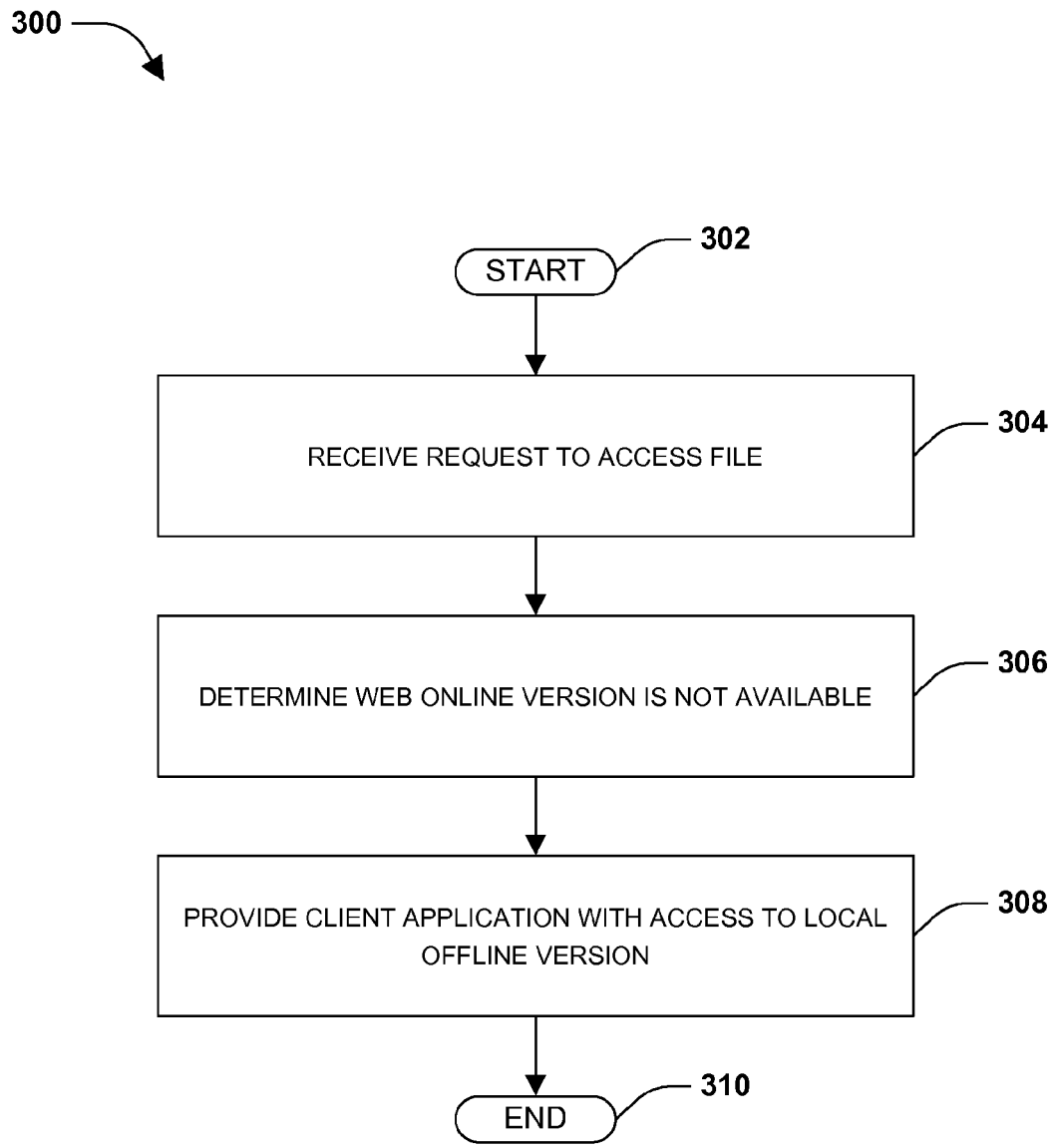
FIG. 3 is a flow chart illustrating an exemplary method of providing a client application with offline access to a file.

One embodiment of providing a client application with offline access to a file is illustrated by an exemplary method 300 in FIG. 3. At 302, the method starts. At 304, a request to access a file may be received from a client application. In one example, the request may comprise a resourceID identifying the file (e.g., the resourceID may uniquely identify the file with the sync module, the web storage service, and/or the client application). Optionally, at 306, unavailability of a web online version of the file may be determined (e.g., a web storage service hosting online storage comprising the web online version of the file may be inaccessible). It may be appreciated that in one example, a sync module may have previously stored a local offline version of the file (e.g., the sync module may have downloaded the web online version of the file as the local offline version of the file stored locally to the client application). At 308, the client application may be provided with access to the local offline version of the file. For example, a local file path associated with the local offline version of the file may be provided to the client application (e.g., the request may comprise a URL associated with the web online version of the file, and the local file path may be determined based upon the URL (e.g., because the online version is not available)). At 310, the method ends.

Figure 4:
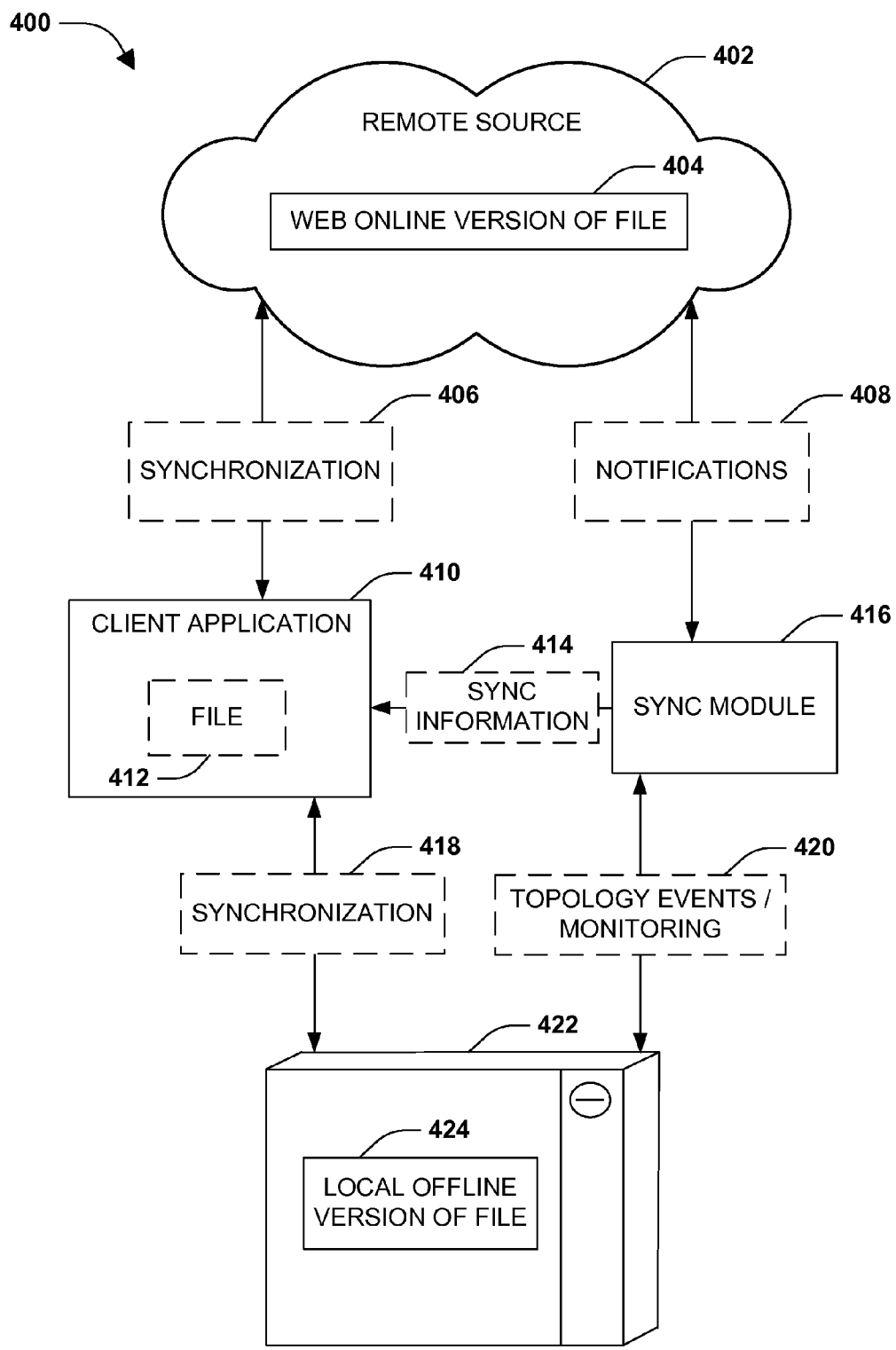
FIG. 4 is a component block diagram illustrating an exemplary system for delegating synchronization authorization to a client application.

FIG. 4 illustrates an example of a system 400 configured for delegating synchronization authorization to a client application 410. The system 400 may comprise a sync module 416.

The sync module 416 may be configured to subscribe to notifications 408 from a remote source 402, such as a web storage service hosting online storage of shared files. The sync module 416 may receive notifications 408 comprising a variety of information associated with shared/synchronized files, such as notifications that a web online version of a file 404 was created, modified, and/or deleted. The sync module 416 may be configured to monitor and/or perform topology events 420 (e.g., create, modify, delete, etc.) associated with local storage 422 (e.g., storage associated with a computing device comprising client application 410) of shared/synchronized files, such as a local offline version of a file 424. In one example, file 404 may be identified by a resourceID (e.g., the resourceID may uniquely identify the file 404 with the sync module 416, the web storage service, and/or the client application 410).

Because the sync module 416 may not comprise sophisticated functionality to handle particular types of files (e.g., functionality used to determine what data within a file to synchronize), the sync module 406 may be configured to provide sync information 414 to the client application 410. The client application 410 may comprise sophisticated functionality for handling files formatted according to particular file types. In this way, the client application 410 may perform synchronization, such as synchronization 406 and/or 418, between a file 412 accessed by the client application 410, the web online version of the file 404, and/or the local offline version of the file 424. The sync module 416 may provide synchronization information to the client application 410 (e.g., information regarding the existence of the sync module 416, where local offline versions of files are stored, etc.). In one example, the sync module 416 may provide a URL associated with the web online version of the file 404 and synchronization authorization within the sync information 414, which may allow the client application 410 to synchronize 406 the file 412 and the web online version of the file 404, for example. In another example, the sync module 416 may provide a local file path associated with the local offline version of the file 424 and synchronization authorization within the sync information 414, which may allow the client application 410 to synchronize 418 the file 412 and the local offline version of the file 424. In another example, the sync module 416 may provide the local file path, the URL, and/or synchronization authorization within the sync information 414, which may allow the client application 410 to synchronize the file 412, the local offline version of the file 424, and/or the web online version of the file 404. The sync module 416 may poll the client application 410 for information regarding synchronization progress, success, and/or failure (e.g., the client application 410 may notify the sync module 416 of new sync events that may be available for polling, which may provide for, among other things, an increase in sync module UI updates with little to no additional overhead, for example). In this way, the client application 410 may perform robust synchronization on behalf of the sync module 416 (e.g., because the sync module 416 may not be equipped, configured, etc. to handle sophisticated synchronization.

Figure 5:
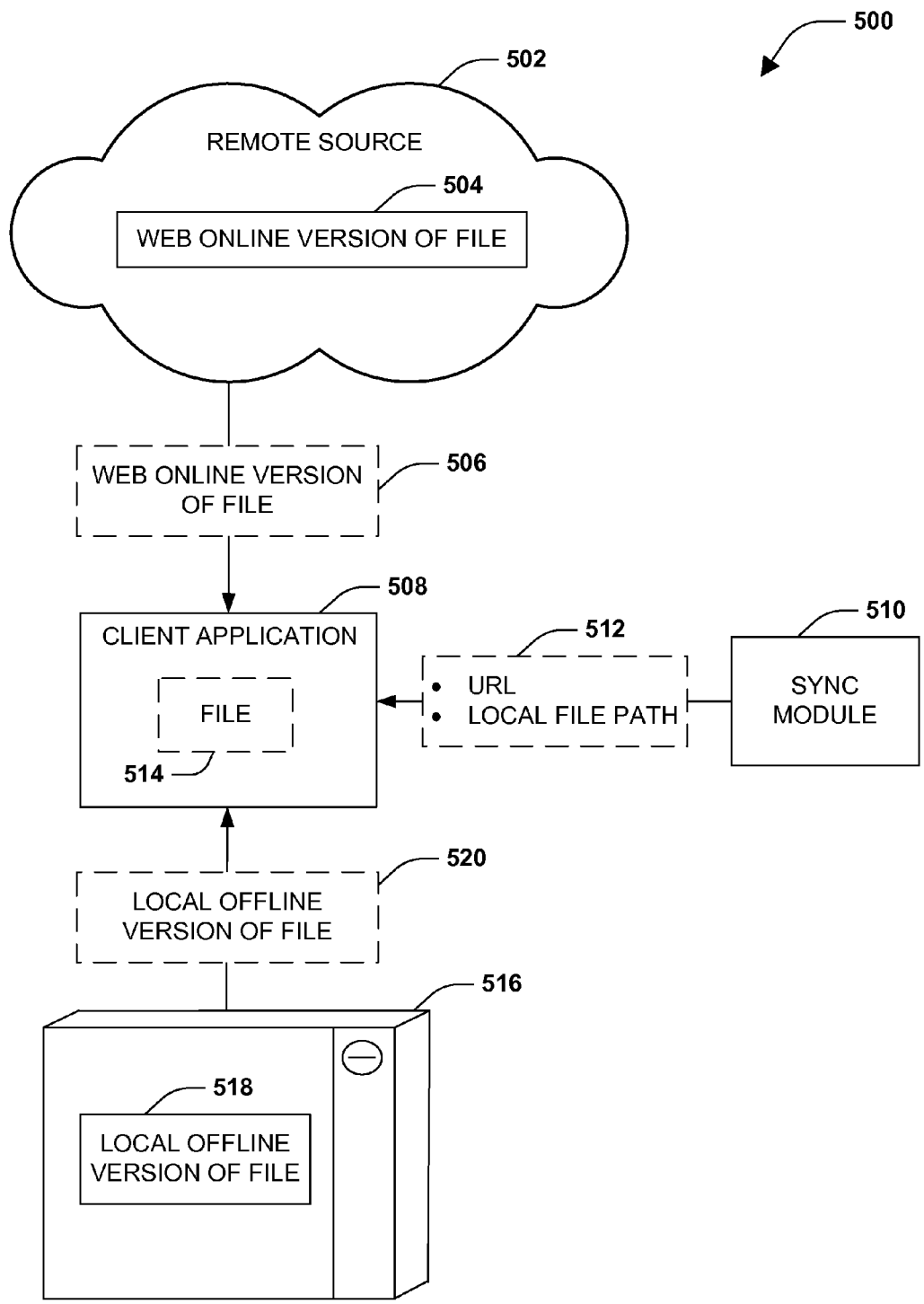
FIG. 5 is a component block diagram illustrating an exemplary system for providing a client application with access to a file.

FIG. 5 illustrates an example of a system 500 configured for providing a client application 508 with access to a file 514. The system 500 may comprise a sync module 510. The sync module 510 may be configured to subscribe to notifications from a remote source 502, such as a web storage service hosting online storage of shared/synchronized files. The sync module 510 may receive information regarding the shared/synchronized files, such as a notification regarding a web online version of the file 504 (e.g., a notification comprising information regarding the creation, modification, and/or deletion of the web online version of the file 504). The sync module 510 may be configured to monitor and/or perform topology events (e.g., create, modify, delete, etc.) associated with local storage 516 (e.g., storage associated with a computing device comprising client application 508) of shared/synchronized files, such as a local offline version of the file 518.

The sync module 510 may be configured to provide sync information 512, such as a URL associated with the web online version of the file 504 and/or a local file path associated with the local offline version of the file 518, to the client application 508. In this way, the sync module 510 may provide the client application 508 with access 520 to the local offline version of the file 518 as the file 514 and/or with access 506 to the web online version of the file 504 as the file 514. The client application 508 may utilize the sync information 512 when accessing the file 514. For example, the file 514 may be opened by the client application 508 utilizing at least some of the web online version of the file 504 and/or at least some of the local offline version of the file 518.

Figure 6:
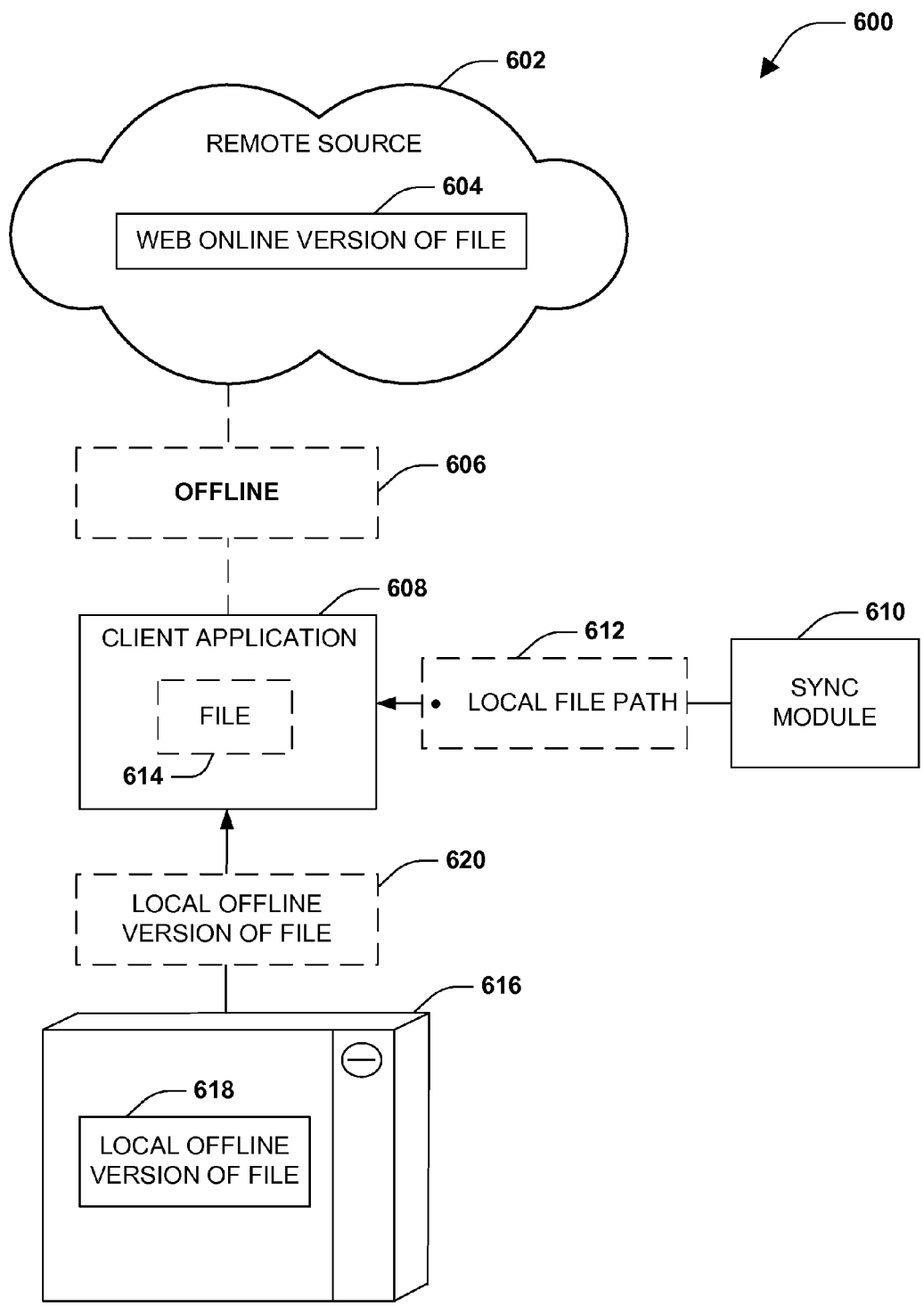
FIG. 6 is a component block diagram illustrating an exemplary system for providing a client application with offline access to a file.

FIG. 6 illustrates an example of a system 600 configured for providing a client application 608 with offline access to a file 614. The system 600 may comprise a sync module 610. The sync module 610 may be configured to subscribe to notifications from a remote source 602, such as a web storage service hosting online storage of shared/synchronized files. The sync module 610 may receive information regarding the shared/synchronized files, such as a notification regarding a web online version of the file 604 (e.g., a notification comprising information regarding the creation, modification, and/or deletion of the web online version of the file 604). The sync module 610 may be configured to locally store versions of shared/synchronized files within local storage 616 (e.g., storage locally accessible to the client application 608). For example, the sync module 610 may store the web online version of the file 604 within the local storage 616 as a local offline version of the file 618. In this way, the sync module 610 may provide the client application 608 with offline access to the file 614 based upon the local offline version of the file 618.

In one example, the sync module 610 may receive a request from the client application 608 to access to the file 614. The sync module 610 may provide the client application 608 with a local file path 612 associated with the local offline version of the file 618. Because the remote source 602 and/or the web online version of the file 604 may be offline 606 (e.g., unavailable to the client application 608), the sync module 610 may merely provide the local file path 612 to the client application 608. The client application 608 may thus access 620 the local offline version of the file 618 as the file 614 using the local file path 610. In this way, the client application 608 may be provided with offline access to the file 614.

Figure 7:
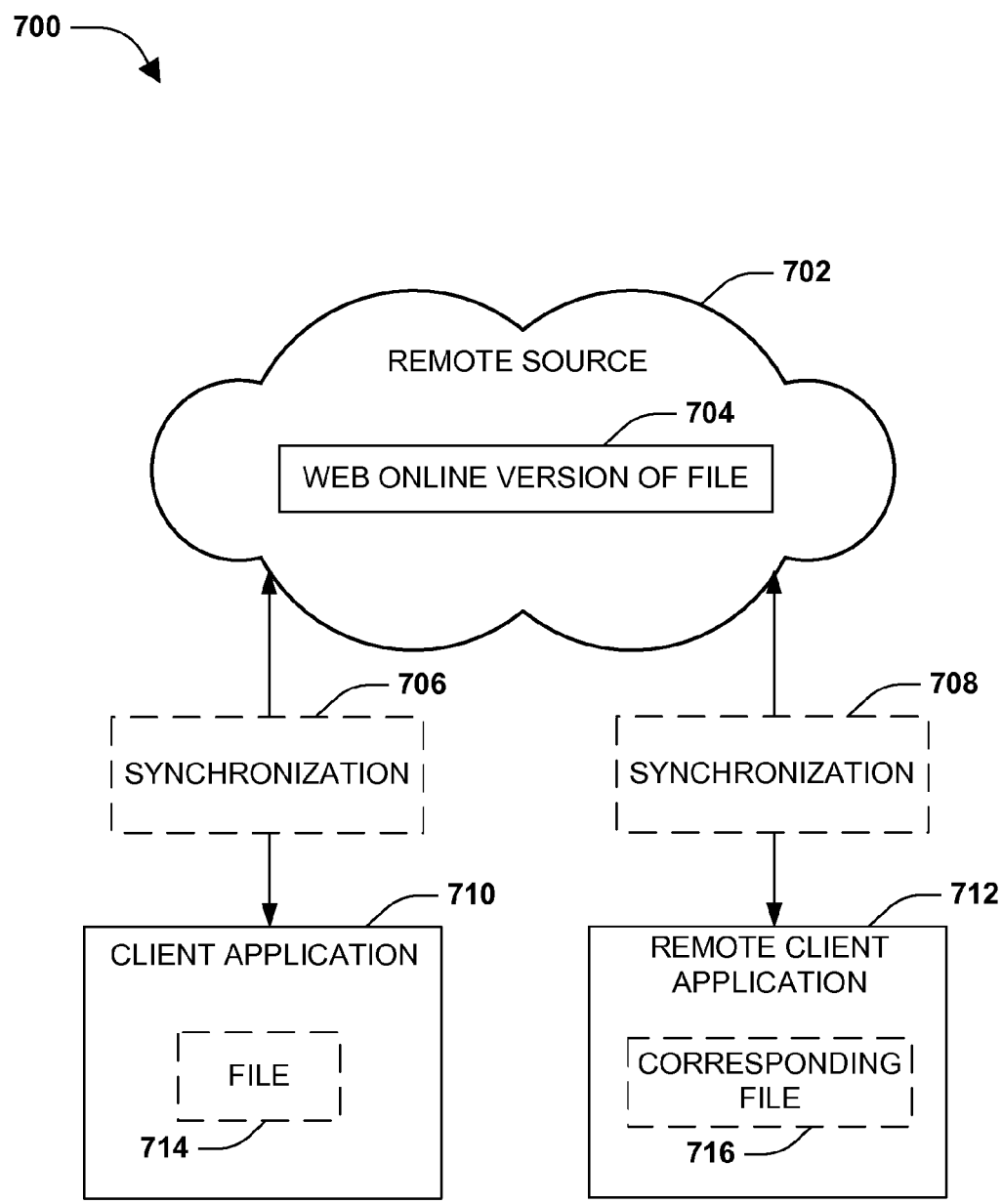
FIG. 7 is an illustration of an example of enabling co-authoring of a document.

FIG. 7 illustrates an example 700 of enabling co-authoring of a document. A document, such as a text file, may be uploaded to a remote source 702, such as a web storage service hosting online storage of shared/synchronized files, as a web online version of a file 704. The web online version of the file 704 may be shared/synchronized between a client application 710, a remote client application 712, and/or other client applications and/or devices (not shown). The web online version of the file 704 may be synchronized 706 to a client device hosting the client application 710 and/or may be synchronized 708 to a remote client device hosting the remote client application 712. The client application 710 may access the web online version of the file 704 as a file 714 (e.g., an instance of the web online version of the file 704). The remote client application 712 may access the web online version of the file 704 as a corresponding file 716 (e.g., an instance of the web online version of the file 704). Because the file 714 and the corresponding file 718 may be synchronized with the web online version of the file 704 while being accessed by the client application 710 and/or the remote client application 712, co-authoring may be enabled. For example, while a user of client application 710 interacts with file 714, the user may be able to see interactions made by a remote user of remote client application 712 with the corresponding file 716. Similarly, while the remote user of remote client application 712 interacts with the corresponding file 716, the remote user may be able to see interactions made by the user with the file 714. In this way, co-authoring may be enabled based upon synchronization 706 and/or synchronization 708 of the web online version of the file 704.

Figure 8:
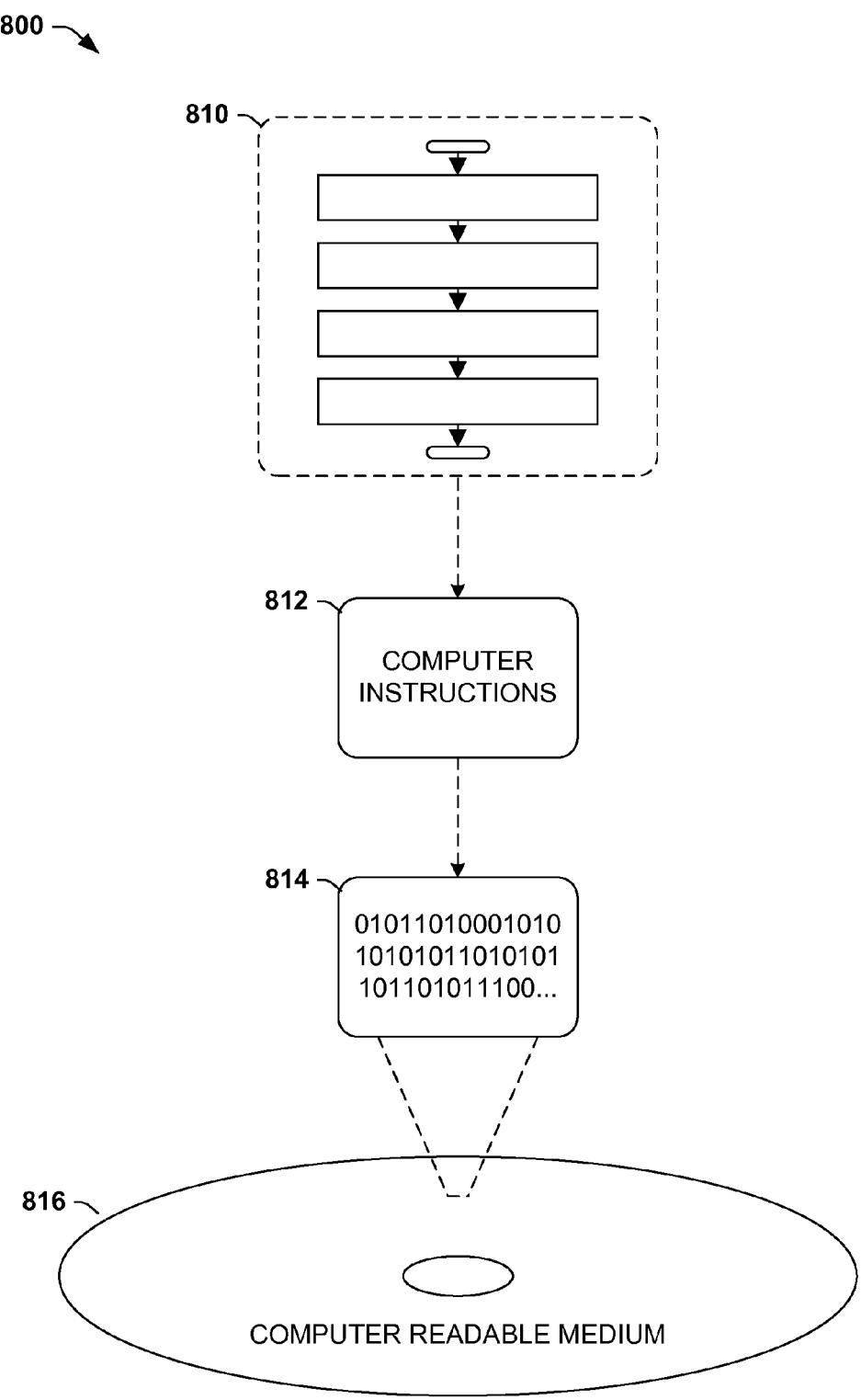
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as at least some of the exemplary method 100 of FIG. 1, at least some of exemplary method 200 of FIG. 2, and/or at least some of the exemplary method 300 of FIG. 3, for example. In another such embodiment, the processor-executable instructions 812 may be configured to implement a system, such as at least some of the exemplary system 400 of FIG. 4, at least some of exemplary system 500 of FIG. 5, and/or at least some of exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

Of course, those skilled in the art will recognize many modifications may be made to this configuration without departing from the scope or spirit of the claimed subject matter.

Figure 9:
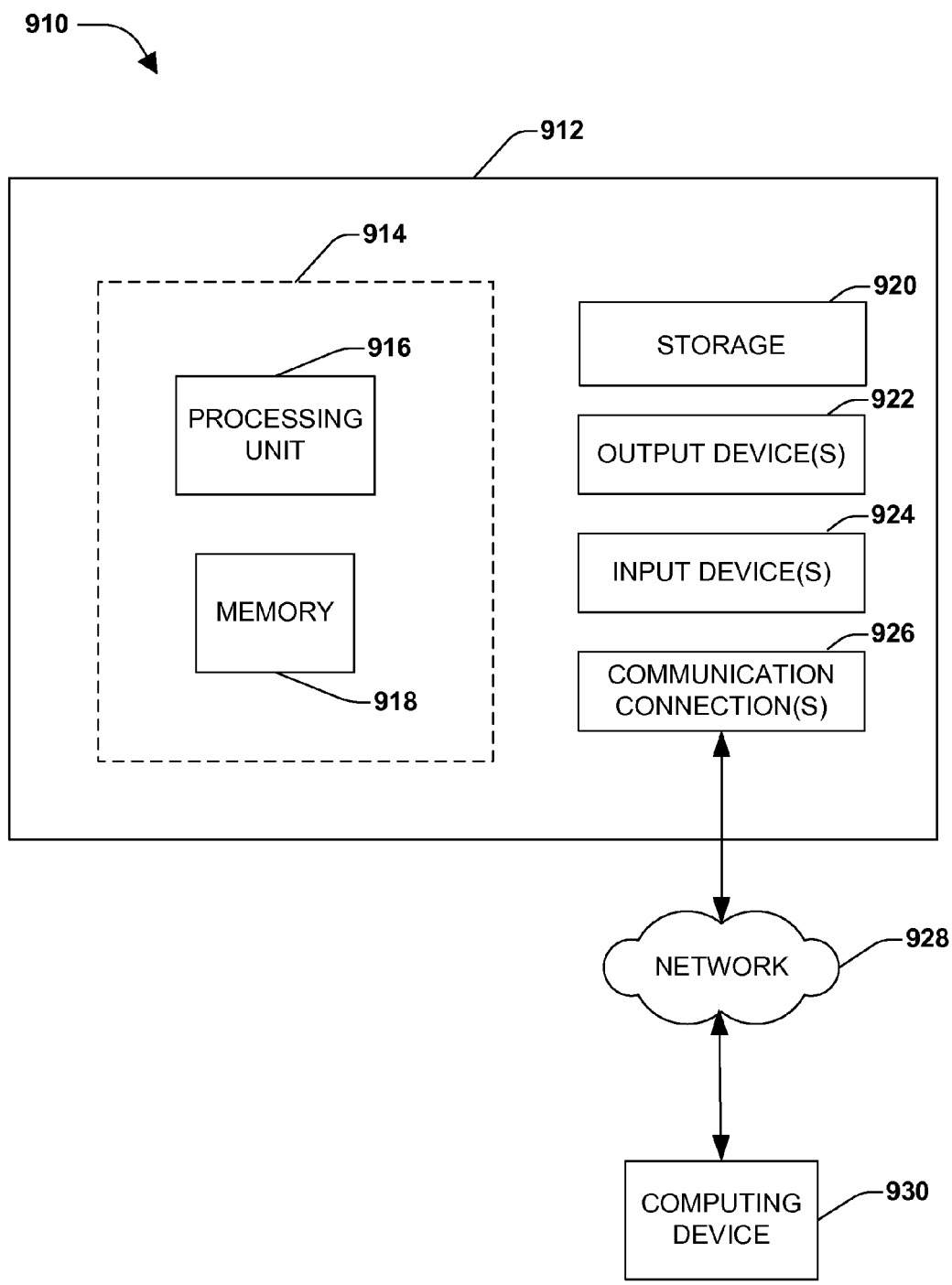
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
   delegating synchronization authorization to a client application to synchronize a file of a file type with at least one of a local offline version of the file or a web online version of the file responsive to a determination that the client application is configured to open the file and has functionality for handling the file type, the determination based upon an operating system registry;
   receiving a request from the client application to access the file; and
   providing the client application with access to both the local offline version of the file and the web online version of the file as the file.

2. The method of claim 1, wherein the file accessed by the client application is derived from at least some of the local offline version of the file and at least some of the web online version of the file.

3. The method of claim 1, the delegating comprising:
   providing the client application with a uniform resource locator (URL) associated with the web online version of the file; and
   delegating synchronization authorization to the client application to synchronize the file with the web online version of the file using the URL.

4. The method of claim 1, comprising:
   providing the client application with a local file path associated with the local offline version of the file and a uniform resource locator (URL) associated with the web online version of the file; and delegating synchronization authorization to the client application to synchronize the local offline version of the file with the web online version of the file using the local file path and the URL.

5. A computer readable storage device comprising instructions that when executed perform a method for providing a client application with access to a file, the method comprising:
  delegating synchronization authorization to a client application to synchronize a file of a file type with at least one of a local offline version of the file or a web online version of the file responsive to a determination that the client application is configured to open the file and has functionality for handling the file type, the determination based upon an operating system registry;
  receiving a request from the client application to access the file; and
  providing the client application with access to both the local offline version of the file and the web online version of the file as the file.

6. The computer readable storage device of claim 5, wherein the file accessed by the client application is derived from at least some of the local offline version of the file and at least some of the web online version of the file.

7. The computer readable storage device of claim 5, the delegating comprising:
  providing the client application with a uniform resource locator (URL) associated with the web online version of the file; and
  delegating synchronization authorization to the client application to synchronize the file with the web online version of the file using the URL.

8. The computer readable storage device of claim 5, comprising:
  providing the client application with a local file path associated with the local offline version of the file and a uniform resource locator (URL) associated with the web online version of the file; and
  delegating synchronization authorization to the client application to synchronize the local offline version of the file with the web online version of the file using the local file path and the URL.

9. A system, comprising:
  a processor coupled to a memory, the memory storing instructions that when executed perform a method for providing a client application with access to a file, the method comprising:
  delegating synchronization authorization to a client application to synchronize a file of a file type with at least one of a local offline version of the file or a web online version of the file responsive to a determination that the client application is configured to open the file and has functionality for handling the file type, the determination based upon an operating system registry;
  receiving a request from the client application to access the file; and
  providing the client application with access to both the local offline version of the file and the web online version of the file as the file.

10. The system of claim 9, wherein the file accessed by the client application is derived from at least some of the local offline version of the file and at least some of the web online version of the file.

11. The system of claim 9, the delegating comprising:
  providing the client application with a uniform resource locator (URL) associated with the web online version of the file; and
  delegating synchronization authorization to the client application to synchronize the file with the web online version of the file using the URL.

12. The system of claim 9, comprising:
  providing the client application with a local file path associated with the local offline version of the file and a uniform resource locator (URL) associated with the web online version of the file; and
  delegating synchronization authorization to the client application to synchronize the local offline version of the file with the web online version of the file using the local file path and the URL.

* * * * *